United States Patent [19]

Vadnais

[11] 4,046,393
[45] Sept. 6, 1977

[54] PORTABLE SLED

[76] Inventor: Kenneth Vadnais, 20322 Beatrice, Livonia, Mich. 48152

[21] Appl. No.: 663,771

[22] Filed: Mar. 4, 1976

[51] Int. Cl.² .......................................... B62B 15/00
[52] U.S. Cl. ...................................... 280/19; 280/24
[58] Field of Search ........................... 280/18, 19, 24; 180/5 R; 74/545

[56] References Cited

U.S. PATENT DOCUMENTS

| 392,062 | 10/1888 | Pedersen | 74/545 |
|---|---|---|---|
| 3,563,562 | 2/1971 | Carlin | 280/19 |
| 3,719,243 | 3/1973 | Losier | 180/5 R |

Primary Examiner—Robert R. Song
Attorney, Agent, or Firm—James M. Deimen

[57] ABSTRACT

A portable plastic sled for the rescue of injured persons and disabled snowmobiles. The sled is constructed of heavy gauge low density polyethylene having a molecular memory and formed to lay substantially flat when unrolled with the exception of the front portion which retains a partial curvature. A transverse bar at the front of the sled includes a socket for attachment of a separate crank to enable the sled to be conveniently rolled into a tight bundle for stowage aboard a snowmobile or all terrain vehicle. The crank is formed with attachments to permit use as a handle for manual towing or as a towbar for snowmobile towing. The crank also becomes a convenient carrying handle when the sled is rolled up. An integral tail on the sled retains the sled in the rolled up condition and multipurpose clasp lines retain the crankhandle to the rolled up sled.

19 Claims, 13 Drawing Figures

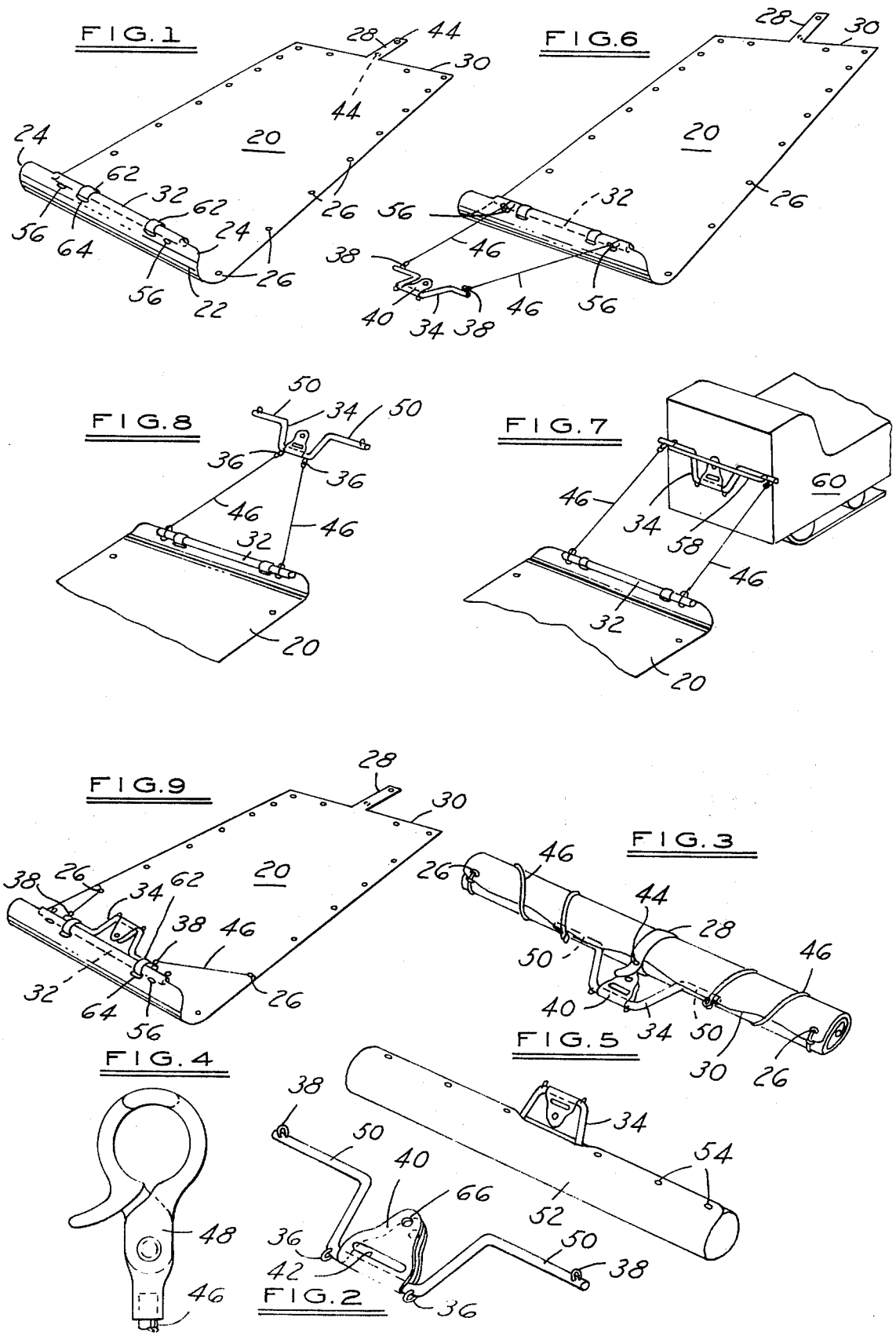

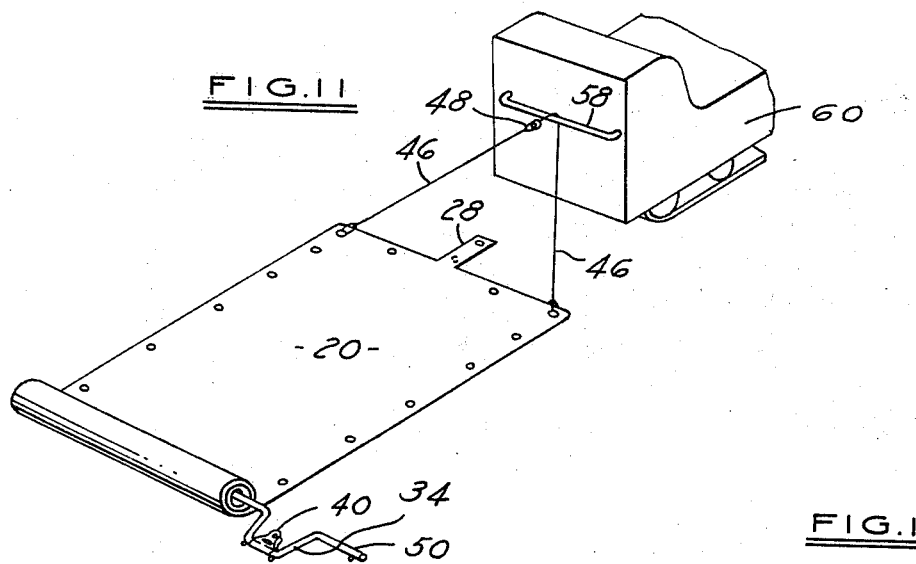
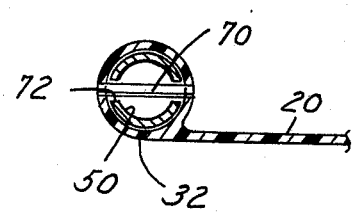
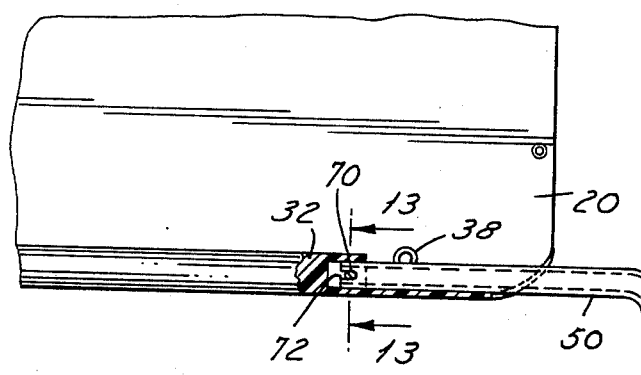
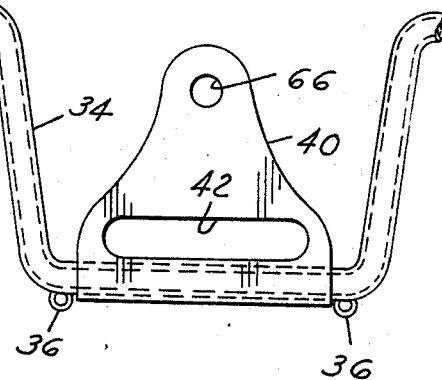
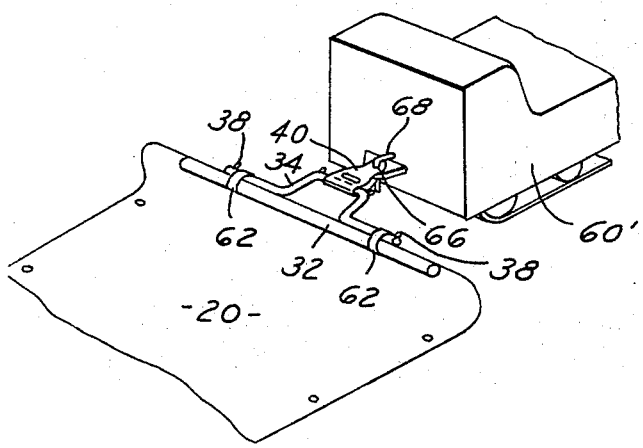

PORTABLE SLED

BACKGROUND OF THE INVENTION

Prior art portable sleds are exemplified by U.S. Pat. Nos. 3,771,808, 3,484,801 and 3,563,562. Such sleds constructed of polyethylene or other plastic, sufficiently thin to roll up as shown in the prior art above, are not sufficiently sturdy for towing heavy loads over rugged terrain including fallen trees and broken rock. Conversely, a prior art sled constructed of plastic sufficiently thick and sturdy for heavy duty use either cannot be conveniently rolled up as shown in the above references or if formed in a rolled condition will not lay flat when unrolled without additional rigid structure or weights at the corners. Such a unit is inconvenient when loading or unloading disabled snowmobiles, all terrain vehicles or other heavy loads. The snowmobile rescue device shown in U.S. Pat. No. 3,563,562 is not suitable for rescue of snowmobiles having disabled front skis and requires special hooks on the snowmobile. U.S. Pat. Nos. 3,140,878 and 3,432,181 disclose toboggan sleds for recreational use and U.S. Pat. No. 2,974,971 discloses a sled like cargo device with a handle attached for towing.

SUMMARY OF THE INVENTION

The invention comprises a portable heavy gauge plastic sled for the towing or movement of injured persons, disabled snowmobiles or heavy loads over rough terrain, in combination with a crankhandle device for tightly rolling up and carrying the sled. The sled is formed to lay flat in unrolled condition thereby permitting a disabled snowmobile or other heavy gear to be dragged onto the sled. Preferably, a plastic such as low density polyethylene having a molecular memory is formed to lay flat with the exception of the front of the sled which is formed with an upward curl. A bar suitably formed in or attached to the sled front extends transversely and includes a socket for attachment of the crankhandle. With the crankhandle the sled can be rolled up tightly from the inside in a convenient manner by a small woman or child despite the resistance of the sled to roll up because of the thickness and molecular memory of the polyethylene. Upon roll up the crankhandle is detached and reattached to the sled as a convenient carrying handle. An integral tail on the sled serves to retain the sled in the rolled up condition and clasp lines serve to retain the crankhandle to the sled. As will be shown below the crankhandle combination incorporated in this invention has multiple uses with the sled depending upon the use to which the sled is put.

DESCRIPTION OF THE DRAWINGS

FIG. 1 is a perspective view of the sled;

FIG. 2 is a perspective view of the crankhandle;

FIG. 3 is a perspective view of the sled rolled up with crankhandle attached;

FIG. 4 is a side view of a spring loaded clasp;

FIG. 5 is a perspective view of the sled rolled up in a carrying case;

FIG. 6 is a perspective view of the sled with the crankhandle attached for one person manual towing;

FIG. 7 is a partial perspective of the sled suitably attached for towing behind a snowmobile;

FIG. 8 is a partial perspective view of the sled with the crankhandle attached for two person manual towing;

FIG. 9 is a perspective view of the sled with the crankhandle attached for use as a toboggan;

FIG. 10 is a partial perspective view of the sled showing an alternative attachment for towing behind a snowmobile;

FIG. 11 is a perspective view of the sled partially rolled up with the crankhandle;

FIG. 12 is a partial cutaway of the sled with the crankhandle attached; and,

FIG. 13 is a partial cross-section taken along the line 13—13 of FIG. 12.

DESCRIPTION OF THE PREFERRED EMBODIMENT

In FIG. 1 the sled comprises a sheet of plastic or similar material 20 formed to lay flat as shown with the exception of the curl at the front 22. The forward corners 24 are rounded to assist in rolling up the sled. A plurality of grommets 26 are inserted in the sled along the sides and back for attachment of cargo tie downs and other purposes. A tail 28 extends from the back 30 of the sled and is preferably formed integrally with the sled. Alternatively, the tail 28 can be attached to the back 30 of the sled with rivets or other fastening means. Molded into the front 22 of the sled is a plastic bar 32 extending transversely. Alternatively, the bar material can be metal and attached with conventional fastening means such as bolts. Preferably the sled is 0.1 inches thick, of polyethylene having a molecular memory and formed to lay flat when relaxed. A 10 foot length and 3½ foot width has been found very suitable for rescue and hauling work, however, the sled size is not limited and can be constructed larger or smaller as desired.

In FIG. 2 the crankhandle 34 includes pairs of rings 36 and 38 attached thereto as shown. The crankhandle may be constructed of metal with metal rings welded thereto or molded of plastic with the rings integrally molded thereto. Attached to the central portion of the crankhandle 34 is a handgrip 40. An optional fingerhole 42 may be included in the grip 40. The grip 40 is rotatable about the crankhandle central portion.

In FIG. 3 the sled is shown in rolled up condition with the tail 28 wrapped thereabout and snapped together with a snap fastener 44 or other fastening means. Two clasp lines 46 each having a spring loaded clasp 48 (as shown in FIG. 4) at one end and a simple loop at the other end are looped through corner grommets 26 at the sled back 30, wrapped about the sled and attached with the clasps 48 to the end rings 38 on the crankhandle 34. The length of each clasp line 46 is such that the ends 50 of the crankhandle 34 are retained tightly against the back 30 of the sled in the rolled up condition and additionally also serve to retain the sled rolled up. The sled can be conveniently carried as shown in FIG. 3 by grasping the grip 40. Optionally, the sled may be encased in a carrying case 52 having snap fasteners 54 and an opening for the crankhandle 34 as shown in FIG. 5.

Returning to the sled in the unrolled condition as shown in FIG. 6, each clasp line 46 may be looped through a slot 56 and about the transverse bar 32 with the clasp 48 attached to a ring 38 of the crankhandle 34. The grip 40 may therefore be conveniently grasped for one person manual towing or the crankhandle 34 inserted behind the tow bar 58 of a snowmobile 60 for towing by the snowmobile as shown in FIG. 7. For two person manual towing the clasp lines 46 and clasps 48 are attached to rings 36 on the crankhandle 34 as best shown in FIG. 8. The ends 50 of the crankhandle 34 now can conveniently serve as handles for each person.

In FIG. 9 the sled is set up for use as a down hill toboggan. The crankhandle 34 is attached to the sled front 22 by continuous strap loops 62 loosely fitting about the bar 32 and passing through slots 64. The strap loops 62 may be formed from a resilient rubber or plastic, bonded into continuous loops after attachment to the sled and sized to just permit the rings 38 on the ends 50 of the crankhandle 34 to pass through with a slight snap back thereby retaining the crankhandle to the bar 32. The clasp lines 46 are looped through a grommet 26 on each side of the sled and the clasp 48 attached to a ring 38. Thus the grip 40 may be grasped by a rider and the toboggan controlled in a conventional manner.

FIG. 10 shows an alternative method of attachment of the sled for towing behind a snowmobile. The crankhandle 34 is attached to the front 22 of the sled by means of the strap loops 62 as in FIG. 9 but toward the outside rather than the inside of the sled. The grip 40 includes a hole 66 suitable for fastening to a snowmobile 60' pinned hitch 68 shown.

In FIGS. 11, 12 and 13 the means and method of tightly rolling up the sled are shown. The clasp lines 46 are each looped through grommets 26 at the rear of the sled and fastened together with the clasps 48 about a heavy or rigid object such as the snowmobile tow bar 58 shown. A tree, person or other heavy item is also suitable. At one end of the bar 32 is a pin 70 fastened therein. One end 50 of the crankhandle 34 is slotted at 72 and sized to fit within the bar 32 and about the pin 70. Upon insertion of the crankhandle 34, the grip 40 and opposite end 50 may be grasped and the crankhandle rotated to tightly roll up the sled whereupon the tail 28 is wrapped about the sled and the snap 44 fastened to retain the sled rolled up until the crankhandle 34 and clasp lines 46 can be detached and reattached as shown in FIG. 3. A bayonet connection or other means of attaching the crankhandle 34 to the bar 32 can alternatively be used.

I claim:

1. A portable sled comprising, an oblong flexible plastic sheet having a front end and a back end, a bar extending transversely along at least a portion of the front end of the sheet and fastened thereto, the bar including engagement means at one end thereof, a separate crankhandle, engagement means on the crankhandle adapted to engage the engagement means on the bar thereby permitting rotation of the crankhandle to tightly roll up the sled, and, separate attachment means on the sled and separate attachment means on the crankhandle to permit at least one alternative attachment of the crankhandle with the sled.

2. The portable sled of claim 1 including retention means adapted to retain the sled in the rolled up condition.

3. The portable sled of claim 2 wherein the retention means comprise a tail attached to the back of the sled and adapted to fasten about the sled in the rolled up condition.

4. The portable sled of claim 3 wherein the tail extends integrally from the back of the sled.

5. The portable sled of claim 1 wherein the bar is integrally molded into the front of the sled.

6. The portable sled of claim 1 wherein the plastic sheet is molded to remain substantially flat in the unrolled condition.

7. The portable sled of claim 1 wherein the attachment means on the sled include means to attach both ends of the crankhandle to the front of the sled.

8. The portable sled of claim 7 wherein the means to attach the crankhandle to the front of the sled include strap loops loosely fitting about the bar and adapted to engage the ends of the crankhandle.

9. The portable sled of claim 7 including a grip rotatably mounted on the central portion of the crankhandle and means on the grip adapted to engage a towing vehicle.

10. The portable sled of claim 1 wherein the attachment means include at least one line adapted to attach the crankhandle to the sled and means on the sled and on the crankhandle for attaching the line to each.

11. The portable sled of claim 10 wherein each line includes a clasp and the crankhandle attachment means include at least one ring adjacent the central portion of the crankhandle and at least one ring at one end of the crankhandle.

12. The portable sled of claim 10 wherein the attachment means on the sled include at least one slot adjacent the bar to permit the line to be looped therethrough and fastened.

13. The portable sled of claim 11 wherein the sled includes fastening means at the back for the line and the line is sized to wrap about the sled in the rolled up condition with the clasp tightly engaging a ring at the end of the crankhandle to retain the crankhandle against the back of the sled.

14. A portable sled comprising, an oblong flexible sheet, a separate crankhandle, at least two separate attachment means on the crankhandle and at least two separate attachment means on the sled to permit at least two optionally selectable attachments of the crankhandle to the sled.

15. The portable sled of claim 14 including engagement means at one end of the sled and co-operative engagement means on the crankhandle adapted to permit roll up of the sled by rotation of the crankhandle.

16. The portable sled of claim 14 wherein the central portion of the crankhandle is displaced from the cranking axis of the crankhandle, and a grip is rotatably mounted on the central portion of the crankhandle, the grip including means adapted to engage a towing vehicle.

17. The portable sled of claim 14 wherein the sheet material is a plastic having a molecular memory and formed to remain substantially flat in the unrolled condition with a slight upward curvature at one end.

18. The portable sled of claim 17 including retention means adapted to retain the sled in the rolled up condition.

19. The portable sled of claim 14 including a bar extending transversely along at least a portion of one end of the sled, the bar including engagement means at one end thereof, and co-operative engagement means on the crankhandle adapted to permit roll up of the sled by rotation of the crankhandle.

* * * * *